Dec. 8, 1925.
J. B. VAN DEREN
1,564,647
AUTOMATIC WEIGHING DEVICE
Filed April 24, 1922   5 Sheets-Sheet 2
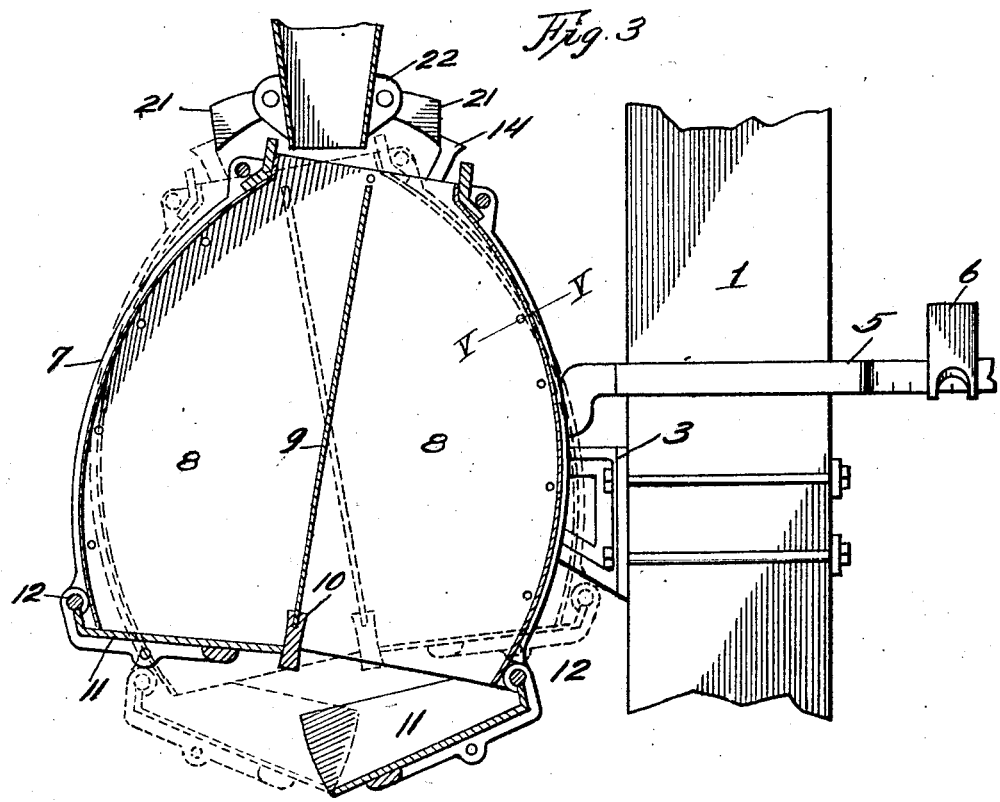
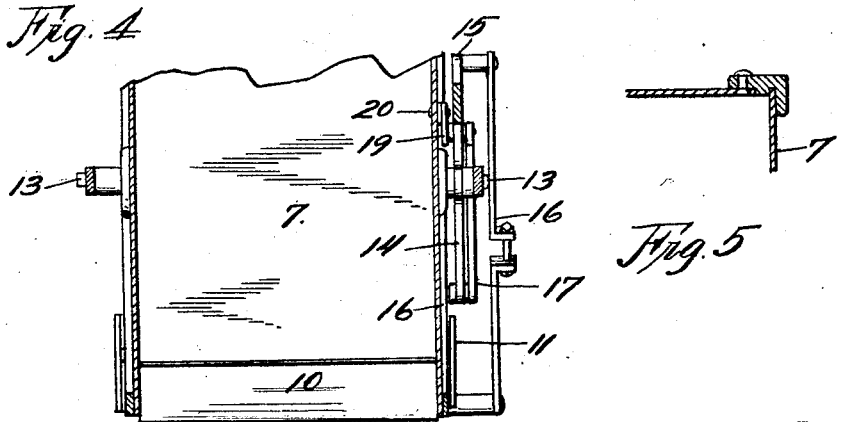
Inventor,
J. B. Van Deren.
Witness:
R. E. Hamilton
By Thorpe & Gerard
Attys Dec. 8, 1925.
J. B. VAN DEREN
1,564,647
AUTOMATIC WEIGHING DEVICE
Filed April 24, 1922    5 Sheets-Sheet 3
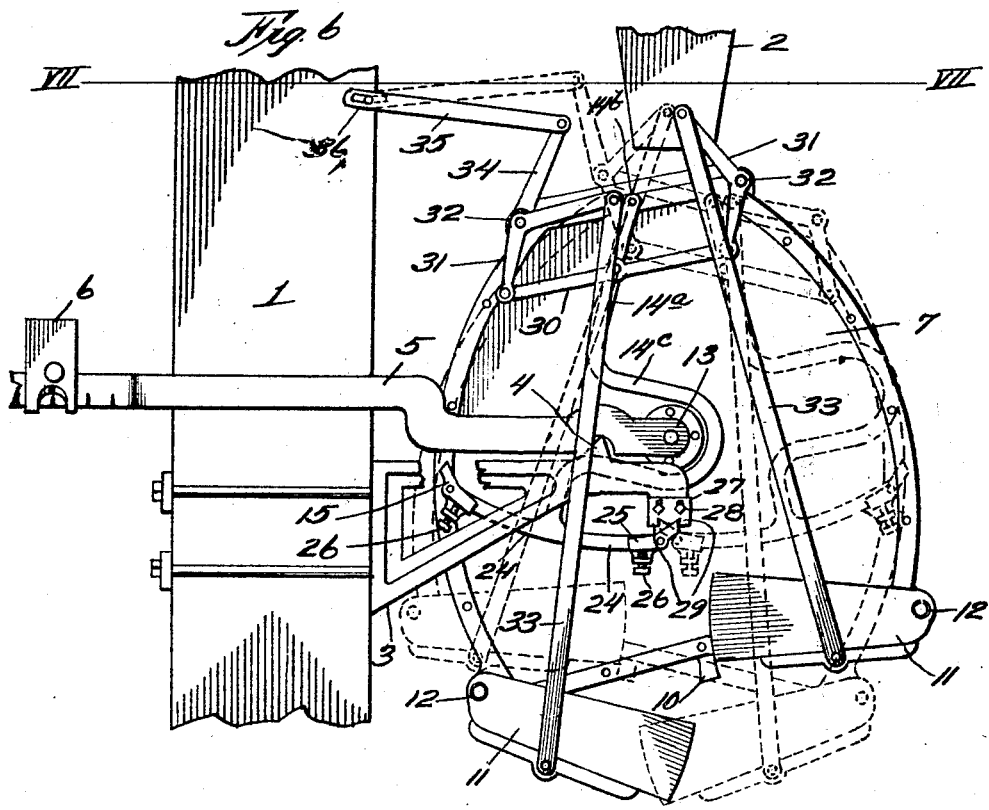
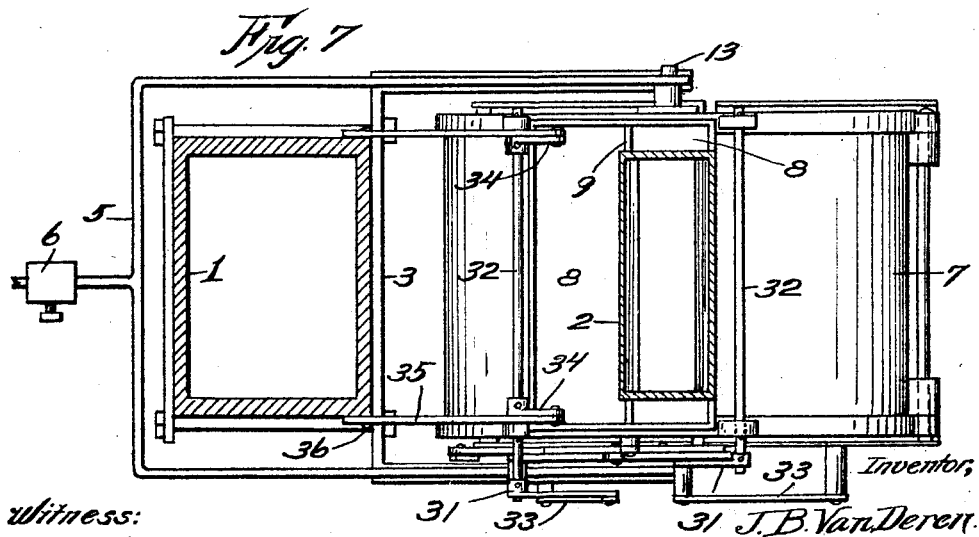

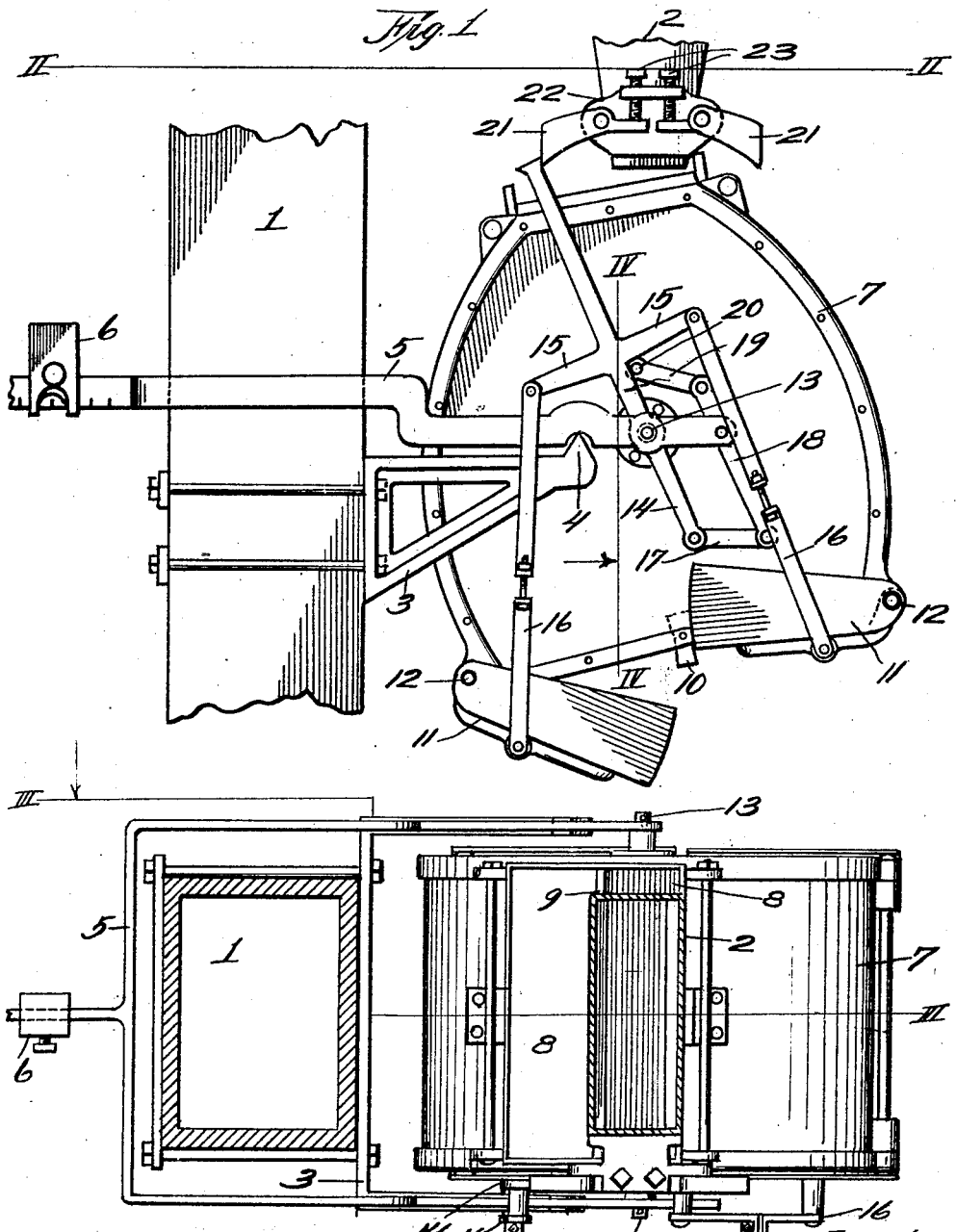

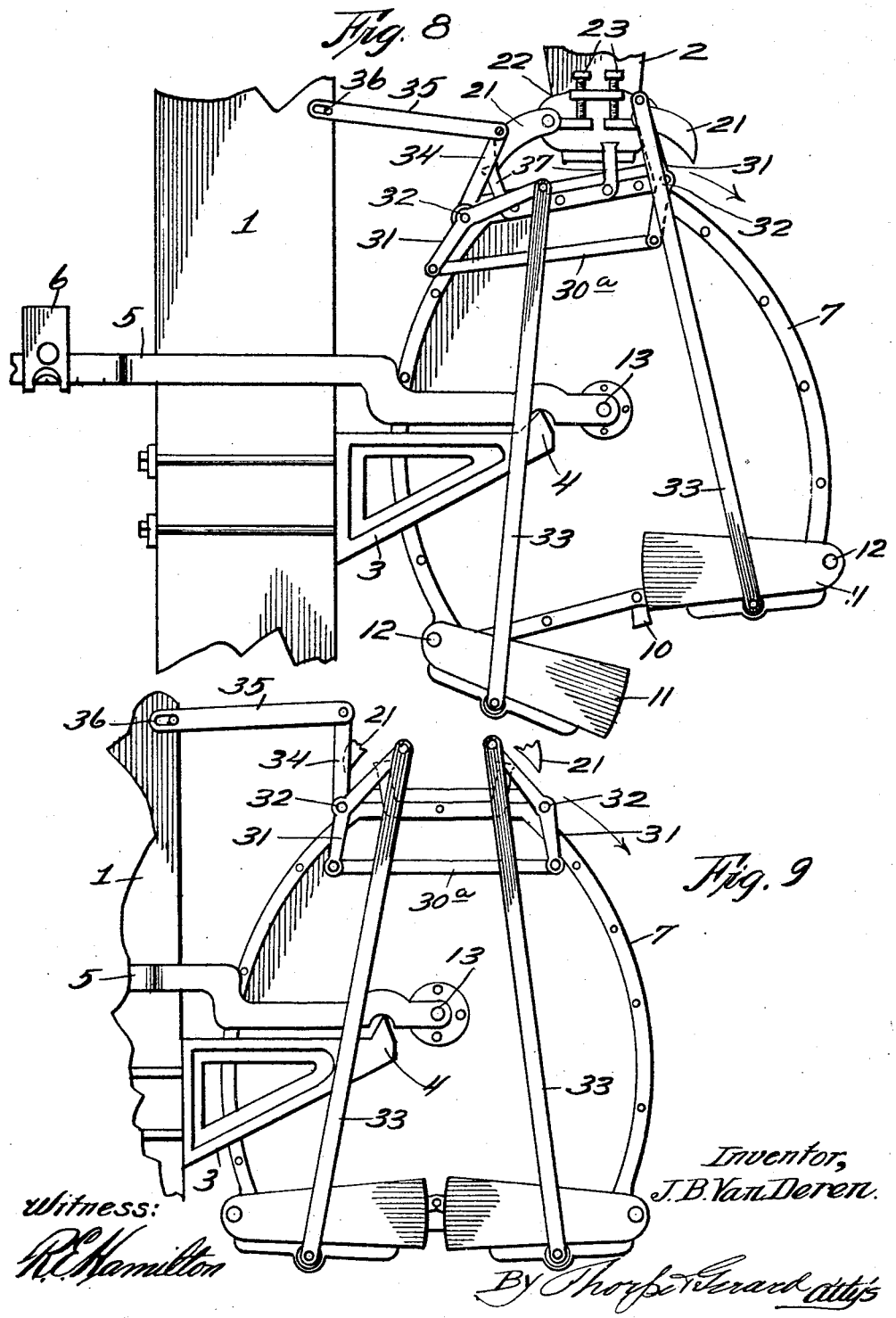

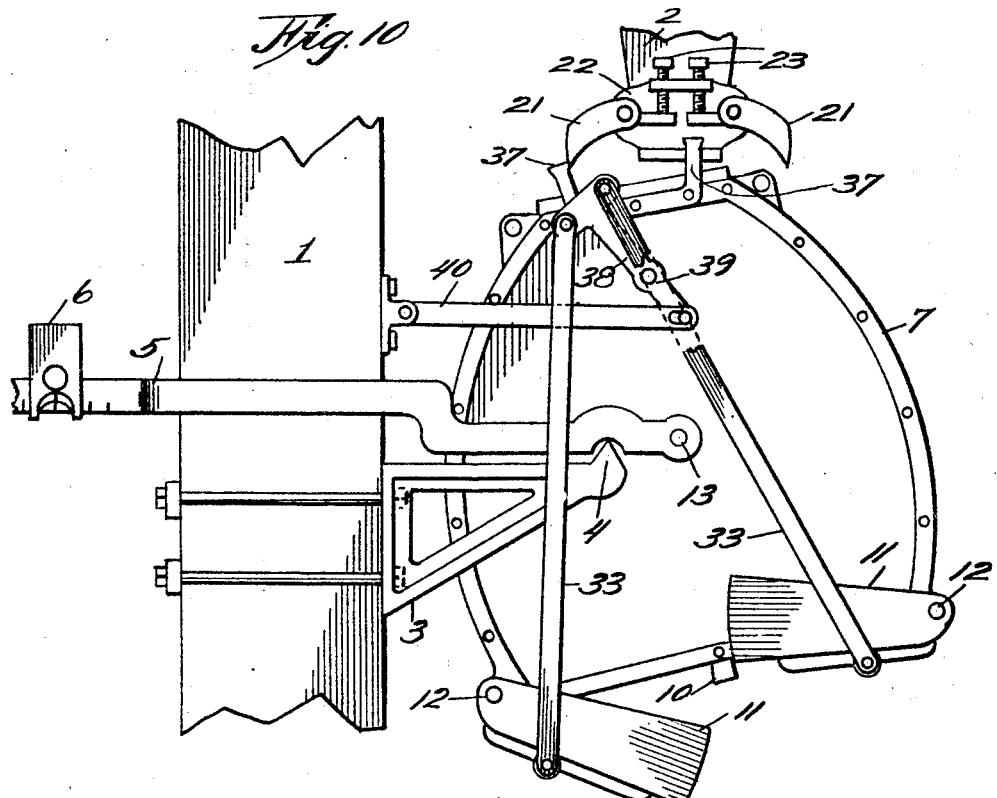
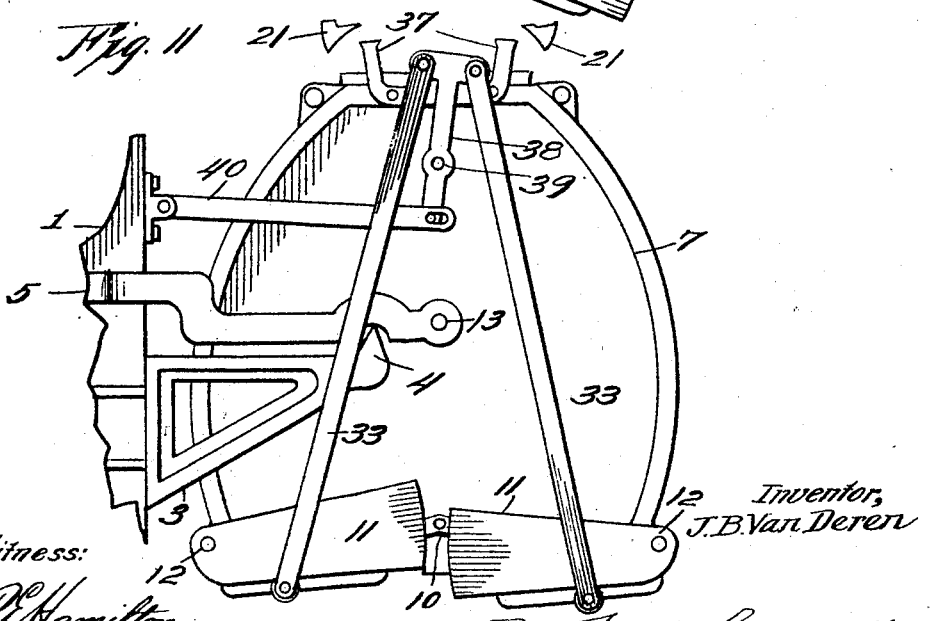

Patented Dec. 8, 1925.

1,564,647

UNITED STATES PATENT OFFICE.

JAMES B. VAN DEREN, OF HENNESSEY, OKLAHOMA.

AUTOMATIC WEIGHING DEVICE.

Application filed April 24, 1922. Serial No. 556,355.

*To all whom it may concern:*

Be it known that I, JAMES B. VAN DEREN, a citizen of the United States, and resident of Hennessey, county of Kingfisher, State of Oklahoma, have invented a certain new and useful Improvement in Automatic Weighing Devices, of which the following is a complete specification.

This invention relates to automatic grain weighing devices of that class in which a double-compartment container is adapted to receive uniform charges of a commodity and under the weight thereof move downward and, in the construction shown, swing or oscillate; the downward movement evidencing the weight of each charge and the oscillatory movement insuring the supply of the charges to the compartments alternately, the compartments having respective doors to open and discharge the weighed charges. Heretofore such devices have been provided in which the gravitative movement of the loaded container has unlatched and opened the closed door and closed the open door, but such devices are objectionable because of failure to work, as under unfavorable conditions, they would sometimes stop on dead center, in which case unmeasured grain would be discharged from both compartments.

One of the objects of the invention is to provide an oscillatory two-compartment container having hinged doors at the bottom for operating simultaneously in reversed directions upward and downward, the doors being so hinged that by the change of position incidental to their operations, they shall cooperatively assist in oscillating the container.

Another object of the invention is to provide a device of the class referred to, having doors so arranged and connected that regardless of the character or condition of the commodity, the closed door shall increase in leverage as it opens and the open door shall offer a diminishing resistance as it closes, the advantage of leverage with the opening door being such as to insure the complete closure of the other door and complete oscillation of the container.

With these and other objects in view, the invention consists in certain novel and useful features of construction and combinations of parts as hereinafter described and claimed; and in order that it may be fully understood, reference is to be had to the accompanying drawings, in which:

Figure 1 is a side elevation of a weighing device embodying the invention;

Figure 2 is a horizontal section taken on the line II—II of Figure 1;

Figure 3 is a vertical section taken on the irregular line III—III of Figure 2;

Figure 4 is a fragmental section taken on the line IV—IV of Figure 1;

Figure 5 is a detail section on the line V—V of Figure 3;

Figure 6 is a side elevation showing a modified form of the device;

Figure 7 is a horizontal section on the line VII—VII of Figure 6;

Figure 8 is a side elevation of another modified construction of the device;

Figure 9 is a similar view but showing the operative parts in a different position of adjustment;

Figure 10 is a side elevation of another modified construction of the device; and Figure 11 is a similar view with the parts in a different position of adjustment.

Referring to the drawings in detail, 1 indicates a leg of an elevator of a threshing machine or the like and 2 is a stationary discharge spout for grain or other commodity. 3 is a bracket secured in fixed relation to part 1 or its equivalent and provided with knife edge bearings 4 upon which is fulcrumed a scale beam 5 equipped with an adjustable poise 6, and pivotally carried by the scale beam which is preferably of U-shape as shown clearly by Figure 2, is an oscillatory container 7, the same being mounted at the opposite side of the fulcrum from the poise.

The container 7 is divided into two similar compartments 8 by a partition 9, and is so positioned with respect to the spout 2 that when tilted to the left a commodity discharged from the spout shall enter the right hand compartment and when tilted to the right the commodity shall enter the left hand compartment, the container when empty bearing a balanced relation with respect to the poise when the latter occupies the zero position on the scale beam, the adjustment of the poise on the beam to measure the quantity of grain to be delivered, holding the container at one end or the other of its oscillatory movement and in elevated position, as customary in this class of weighing device.

At the lower end of the container 7 in line with the partition 9 and forming in effect a continuation thereof, is a depending division bar 10, and controlling the bottoms of the compartments respectively are doors 11, pivoted at 12 concentrically with the adjacent faces of the division bar, which are preferably concaved as shown clearly by Figure 1. The connection of the container with the scale beam is preferably by means of stub-shafts 13 secured to opposite sides of the container and journaled in the scale beam, as shown most clearly by Figure 1. Pivoted upon one of the stub-shafts 13 is a rocker bar 14, and said bar is provided above its pivotal point, with a pair of oppositely-projecting arms 15 pivotally connected to the upper ends of a pair of links 16, which links are pivoted at their lower ends to the doors 11 below the plane of the hinge points thereof, this arrangement providing for transmission of power from the opening door to the closing door to close the latter, and it will be noted in this connection that due to the arrangement of said parts, the leverage of the opening door increases as it opens and the resistance of the closing door diminishes as it closes.

A link 17 pivotally connects the lower end of the rocker bar 14 below the fulcrum thereof, to the lower end of an equalizing lever 18 fulcrumed on the scale beam at the free end thereof, that is—at the opposite side of the pivotal point of the container from the fulcrum point of the scale beam, and the upper end of the equalizing lever is pivotally connected by a link 19 to the container as at 20. By this arrangement, it will be apparent that the greater leverage of the opening door is compounded and is utilized to assist in the oscillation of the container itself, the link 19 pulling the container to the right when the oscillation is in that direction and pushing it to the left when the oscillation is in a corresponding direction.

To lock the rocker bar 14 against rocking action until the predetermined weight of grain has been discharged into the compartment closed by the respective door, a pair of pivoted catches 21 are mounted upon a bracket 22 secured to the spout 2, and to vertically adjust said catches to insure delivery of uniform charges of commodity from each compartment, screws 23 are mounted in bracket 22 and engage said catches.

When the container is elevated and occupying one of its extreme tilted positions, the upper end of the rocker bar 14 is engaging the outer end of one of the catches 21, and as the weight of the commodity increases, the container moves downward, such movement ceasing as the rocker bar clears the lower end of said catch, this action occuring when the predetermined quantity of commodity has been received by said compartment. Immediately the rocker bar is disengaged from said catch, the preponderating weight at one side of the container, starts the same on its oscillatory movement, and as the weight of grain on the closed door gives the same increased leverage over the other door, the closed door starts to open and the other door to close, the connection between the doors and container being such that the initial part of the opening movement of the closed door is slower and of less extent than the initial part of the closing of the other door, so that by the time the leverage of the doors balances, the container occupies a vertical position, and the commodity is just beginning to be discharged from the opening door. During the remainder of the operation of the doors, the reverse of that above stated is true, that is to say the opening door moves a greater distance and at greater speed than the closing door, and the advantage of leverage at such time is in favor of the opening door independent of the weight of the commodity thereon, this advantage of leverage increasing until said door is fully open and the other door fully closed. This advantage of leverage is desirable because the weight of the commodity upon it is gradually diminished and the advantage of leverage obtained by the opening door itself is depended upon to insure the complete closure of the other door, and in addition, to exert a force upon the container for assisting in the oscillation of the latter until the upper end of the rocker bar has cleared the outer end of the other catch 21, the catch of course yielding to permit the rocker bar to pass, and the instant the latter has cleared the outer end of said catch, the poise reelevates the container so that the last-named catch shall maintain the container in its reversed oscillatory position so that the charge of grain shall continue to enter the other compartment, it being understood that the charge began to enter such compartment shortly after the oscillatory movement described, had begun, the parts being so proportioned, however, that the closing door had closed sufficiently to guard against any escape of grain entering such compartment.

In Figures 6 and 7, the rocker bar 14$^a$ is pivotally suspended at 14$^b$ from the upper end of the container 7, and is provided with a loop or goose-neck portion 14$^c$ extending around the pivotal point of the container, and at its lower end with outwardly projecting arms 24, equipped at their outer ends with pivoted catches 25, adjustable by set screws 26. In this case, therefore, it will be seen that the catches are carried by the rocker bar, and for engagement by said catches, a latch plate 27 is mounted by bolts 28 upon an extension of one of the brackets 3, said plate having a pair of reversed ratchet-shaped notches 29 for respective engagement by said latches. In this case, the rocker bar pivotally carries a cross rocker bar 30, pivotally connected to the depending arms of a pair of bell crank levers 31 mounted on parallel rock shafts 32 journaled on the container at opposite sides of the opening at the upper end thereof, the other end of said bell crank levers being pivotally connected by links 33 with the doors 11 below the hinge point of the latter. One of the shafts 32 is provided with a crank arm 34 pivotally connected at its upper end to a bar 35 having a pin and slot connection at 36 with the elevator leg 1 or other fixed point. In this construction it will be noted that when the container is being charged at one side of its partition, the leverage, as in the other construction described, is in favor of the open door, and it will also be evident that the operative parts remain in this position until a predetermined weight of commodity has been discharged into the closed compartment and has depressed the container sufficiently to disengage the right hand catch, in this case, from the latch plate, the preponderating weight of the closed compartment starting the container on its oscillatory movement to the right. As this action starts the weight of the commodity on the closed door starts opening movement thereof and closing movement of the other door, and as in the other case, it will be noted that the connections between the doors and the container are such that the leverage of the opening door increases and the resistance of the closing door decreases. It will be also noted that the rocking of the container due to the operation of the doors, is accelerated and assisted by tending to rock arm 34 to the right and applying thrust through the bar 35 on the fixed part 1, the action being analogous to that described in connection with the construction already described where the equalizing lever 18 is fulcrumed on the relatively fixed scale beam. When the container has been fully oscillated as explained, the other catch 25 engages the other or oppositely-facing notch 29 of the latch plate, for the purpose of holding the container in its new position for receiving the charge of grain in the other compartment, it being of course understood that the poise effects the reelevation of the container, as described in connection with the construction previously referred to.

In the construction disclosed by Figures 8 and 9, it will be noted that the rocker bar 14 is omitted, but that the connection between the container, doors, and fixed part 1, is the same as disclosed by Figure 6, the link 30ª connecting the bell cranks 31, being given a different reference character to distinguish it from the corresponding link of Figure 6, as in the latter said link is pivotally connected to the rocker bar. In this case, arms 37 suitably spaced and rigidly secured to the upper end of the container are utilized for engagement with the respective catches 21 for guarding against oscillatory movement of the container until the proper compartment thereof has been charged sufficiently to effect the downward movement of the container and the consequent tripping of engagement between the engaged catch 21 and arm 37. In other respects the operation of this form of the device is identical with those already described and hence there is no necessity to repeat the description of operation or detailed construction common in all the types disclosed.

In Figures 10 and 11, a rocker bar 38 of substantial T-shape is pivoted at 39 to the container above the pivotal point of the latter on the scale beam, the T-shaped rocker bar being in principle, the same as the rocker bar 14ª of Figure 6, except that it is inverted with respect to the latter and is so proportioned that the link connecting it with the closed door, stands almost on dead center with respect to the pivotal point 39 and hence almost completely locks said door from opening under the imposition of any weight imposed upon it, it being noted however, that, as in the other structures described, the leverage of the opening door gradually increases while the resistance of the closing door gradually decreases. In this construction it is practically essential to provide a thrust bar 40 between the elevator leg 1 or other fixed point, and the lower end of the rocker bar 38, so that after the container is charged to the requisite degree and moves downward, and the charge starts to oscillate the container, said thrust bar shall afford the necessary resistance to impart rocking movement to the rocker bar for the purpose of facilitating the initial opening movement of the closed door and closing movement of the other door. In this construction arms 37 are provided as in the construction shown by Figures 8 and 9, for engagement with the respective catches 21.

It will be apparent that in all of the different constructions shown, the employment of hinged doors of the character set forth cooperate with the gravitative force of the charged compartment to positively insure full oscillation of the container, full opening and closing of the doors, and the holding of the container in either of its extreme positions with the closed door closed, until the scale poise has returned the container to its elevated position and the latch mechanism has consequently functioned, and that by amplifying the leverage, that is by increasing the leverage of the opening door and diminishing the resistance of the closing door, the results set forth are even more positive of accomplishment, and the advantage of having the yieldingly depressed catches or latch plates as the case may be, reduces friction to the minimum and enables the operator to insure delivery of grain or the like in uniform weight from each compartment, the machine therefore being more dependable and efficient in its operation.

It will be apparent that in the constructions disclosed by Figures 1 and 6, the locking arms may be replaced by catches 37 without affecting the results obtained, but in said constructions the locking arms are preferable.

It will be apparent that the relation of the operative parts as shown, may be established where the container operates without oscillation, for example, where a deflector is employed for alternately charging the flow of a commodity from one compartment to the other as the doors open and close, respectively, and that while the preferred types of unlocking mechanism are shown, it is to be understood that other means or power may be employed to accomplish the same purpose, without departing from the spirit and scope of the appended claims.

I claim:

1. In an automatic weighing device, a container having two compartments and pivotally mounted to alternately dispose the compartments in a common receiving position, wing doors hinged to the container for alternately opening and closing the bottoms of said compartments respectively, and means connecting the doors to each other and the container whereby under the gravitative force of a commodity, the operative force of the doors shall co-operate with the rotative force of the container.

2. In an automatic weighing device, a container having two compartments and pivotally mounted to alternately dispose the compartments in a common receiving position, hinged doors for alternately opening and closing the bottoms of said compartments respectively, by downward and upward movements, means connecting the doors to each other and to the container whereby under the gravitative force of a commodity, the operative force of the doors shall cooperate with the rotative force of the container, the connections between the doors and between each door and the container bearing such relation that the leverage of the opening door shall constantly increase and the resistance of the closing door shall constantly diminish.

3. In an automatic weighing device, a container having two compartments and pivotally mounted to alternately dispose the compartments in a common receiving position, wing doors hinged on the container for alternately opening and closing the bottoms of said compartments respectively, means for connecting the doors to each other and to the container whereby under the gravitative force of a commodity, the operative force of the doors shall cooperate with the rotative force of the container, and means for locking the closed door against movement until the container has been depressed a predetermined distance.

4. In an automatic weighing device, a container having two compartments and pivotally mounted to alternately dispose the compartments in a common receiving position, hinged doors for alternately opening and closing the bottoms of said compartments respectively, by downward and upward movements, means connecting the doors to each other and to the container, a relatively fixed part, and connections between said part, the container and the first-named means for transmitting power from the opening door to the container to assist in the oscillation thereof.

5. In an automatic weighing device, a yieldingly elevated container, having two compartments, hinged doors for alternately opening and closing said compartments respectively, by downward and upward movements, means pivoted on the container, and links respectively pivoted to the doors and to said means; each link when its respective door is closed bearing a locked relation to said means to prevent the opening of such door until the locked relation is broken, the relation of said parts being such that on the application of sufficient force to break the locked relation the opening door shall gain in leverage on the container in its opening movement while the closing door shall decrease in resistance.

6. In an automatic weighing device, a yieldingly elevated container, having two compartments, hinged doors for alternately opening and closing said compartments respectively, by downward and upward movements, means pivoted on the container, links respectively pivoted to the doors and to said means; each link when its respective door is closed bearing a locked relation to said means to prevent the opening of such door until the locked relation is broken, and means to break such locked relation, the relation of said parts being such that on the application of sufficient force to break the locked relation the opening door shall gain in leverage on the container in its opening movement while the closing door shall decrease in resistance.

7. In an automatic grain weigher, a yieldingly-elevated container having two compartments and a division bar depending from the container between and beyond the planes of the bottoms of the compartments, a T-shaped rocker bar pivoted to the container, hinged doors controlling the bottoms of the compartments and operable up and down in reversed directions simultaneously, and connections attached at their upper ends to the ends of the rocker bar above the pivotal point thereof, and to the doors below the plane of the hinge points thereof.

8. In an automatic weighing device, a container having two compartments and pivotally mounted to alternately dispose the compartments in a common receiving position, hinged doors for alternately opening and closing the bottoms of said compartments respectively, and means connecting the doors to each other, the container, and a relatively fixed object, whereby under the gravitative force of a commodity, the operative-force of the doors shall cooperate with the rotative force of the container, and means for locking the container in alternate receiving positions, and unlocking the same as a predetermined weight of commodity has accumulated therein, the locking and unlocking of the container to also lock and unlock the doors cooperatively.

9. In an automatic weighing device, a container having two compartments and pivotally mounted to alternately dispose the compartments in a common receiving position, hinged doors for alternately opening and closing the bottoms of said compartments respectively, and means connecting the doors to each other, the container, and a relatively fixed object, whereby under gravitative force of a commodity, the operative-force of the doors shall cooperate with the rotative force of the container.

10. In an automatic grain weighing device, a container having two compartments and pivotally mounted to alternately dispose the compartments in a common receiving position, hinged doors for alternately opening and closing the bottoms of said compartments respectively by downward and upward movements, means connecting the doors to each other, the container, and a relatively fixed object whereby under the gravitative force of a commodity, the operative-force of the doors shall cooperate with the rotative force of the container, the connections between the doors and the container being such that the leverage of the opening door shall constantly increase, and the resistance of the closing door shall constantly diminish.

11. In an automatic grain weighing device, a container having two compartments and pivoted to alternately dispose the compartments in a common receiving position, a pair of wing doors hinged on the container for controlling the discharge openings of said compartments and means whereby as the container is oscillated the doors are opened and closed and when the container is held with a compartment in receiving position the respective door is thereby held in closed position.

12. In an automatic grain weighing device, a container having two compartments and pivoted to alternately dispose the compartments in a common receiving position, a pair of wing doors hinged on the container for controlling the discharge openings of said compartments, means whereby as the container is oscillated the doors are opened and closed and when the container is held with a compartment in receiving position the respective door is held in closed position, and a latch mechanism to alternately hold said compartments in receiving position and tripped by downward movement of the container.

In witness whereof I hereunto affix my signature.

JAMES B. VAN DEREN.